June 9, 1953  J. C. KREJCI  2,641,534
CARBON BLACK FURNACE AND PROCESS FOR MAKING CARBON BLACK
Filed Dec. 14, 1950  3 Sheets-Sheet 1

INVENTOR.
J. C. KREJCI
BY Hudson & Young
ATTORNEYS

INVENTOR.
J. C. KREJCI
BY Hudson & Young
ATTORNEYS

June 9, 1953  J. C. KREJCI  2,641,534
CARBON BLACK FURNACE AND PROCESS FOR MAKING CARBON BLACK
Filed Dec. 14, 1950  3 Sheets-Sheet 3

INVENTOR.
J. C. KREJCI
BY Hudson & Young
ATTORNEYS

Patented June 9, 1953

2,641,534

UNITED STATES PATENT OFFICE 2,641,534

CARBON BLACK FURNACE AND PROCESS
FOR MAKING CARBON BLACK

Joseph C. Krejci, Phillips, Tex., assignor to Phillips Petroleum Company, a corporation of Delaware Application December 14, 1950, Serial No. 200,816

4 Claims. (Cl. 23—209.4)

This invention relates to processes and furnaces used in the manufacture of carbon black. In another aspect it relates to a liquid fuel burner for supplying the heat of reaction to processes and furnaces for manufacturing carbon black.

In my copending application Serial No. 743,893, filed April 25, 1947, now U. S. Patent No. 2,564,700 dated August 21, 1951, I described a process of making carbon black and apparatus for carrying out the same in which application the fourth from the last paragraph of the specification discloses that hydrocarbon may be used as a spray or vapor as the peripheral heating fuel in the process in the peripheral burners of said application. The present application is an improved burner for use in burning the peripheral liquid fuel in the same and in similar processes and furnaces as those of said copending application, and while commercially valuable results have been obtained with said peripheral burners 20, 22, 26, 15, p, and 32 in Figures 1, 2, 3, and 4 of said copending application by burning hydrocarbon oils as a spray or vapor therein, the present burner of the present application gives improved results.

One object of the present invention is to provide an improved carbon black furnace.

Another object is to provide an improved oil burner for a carbon black furnace.

Another object is to provide an improved process of making carbon black.

Numerous other objects and advantages will be apparent to those skilled in the art upon reading the accompanying specification, claims and drawings.

In the drawings—

Figure 1:
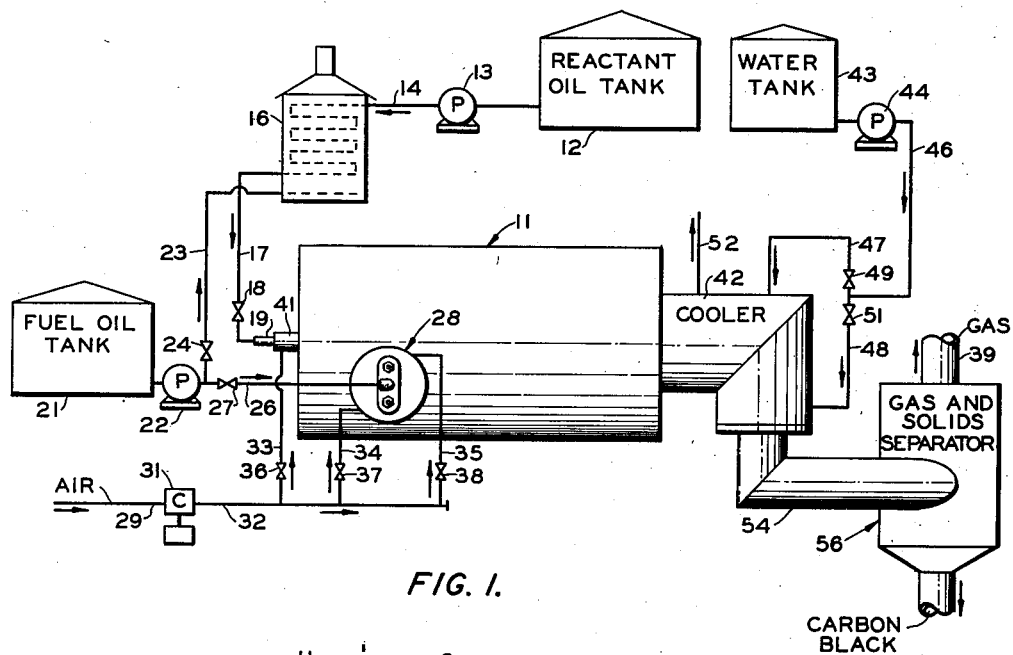
Figure 1 is a diagrammatic elevational view of a carbon black producing furnace and auxiliary equipment for the same, embodying the present invention.

In Figure 1 a carbon black furnace generally designated as 11 is specifically adapted to make carbon black out of reactant carbonaceous materials preferably such as a gas oil in reactant oil tank 12. The reactant hydrocarbon 12 is preferably pumped by pump 13 through line 14 including vaporizer 16 in which the reactant oil is preferably vaporized. The flow of vaporized oil passes through line 17 controlled by valve 18 to a hydrocarbon injector 19 disposed to discharge a stream of hydrocarbons predominantly axially into a chamber 57 of said furnace 11. In order to heat this axially moving hydrocarbon so as to convert the same to carbon black by pyrochemical reactions similar to cracking the reactant fuel 12 is heated in furnace 11 by liquid fuel 21. Liquid fuel 21 may be the same material as the gas oil from tank 12 but need not necessarily be of such high grade, and may be any liquid fuel, such as cheaper grades of fuel oil. While carbon black can be made with any carbonaceous liquid material as the reactant material in tank 12, it is preferable to use a gas oil derived from a cracking process which has an API gravity of 16 to 25 degrees and an end point of 600° to 800° F.

The fuel from tank 21 may be pumped by pump 22 through line 23 controlled by valve 24 to heat the vaporizer 16, while some of this fuel may be pumped through line 26 controlled by valve 27 into an oil burner generally designated as 28, wherein it is vaporized, and/or burned, to provide heat for the pyrochemical cracking type of reaction in chambers 57 and 58, which forms carbon black out of the reactant material 12 from tank 12. Vaporizer 16 however could be heated from a separate source, or unheated, in which case it is not a vaporizer and the oil is merely sprayed into chamber 57 from pipe 19, which can be provided in that instance with an oil spray nozzle 63 shown in detail in Figure 6.

In order to provide proper heat for the reaction in furnace 11 it is necessary to flow oxygen-containing gas into furnace 11, which is generally air coming through pipe 29 which may be compressed by compressor 31 and passed through pipe 32, 33, 34 and 35 controlled by valves 36, 37 and 38, as will be described in detail below.

While air is normally the source of oxygen-containing gas, it is sometimes useful when gas 39 is to be used as a synthesis gas for making other synthesized chemicals, to use oxygen or mixtures of oxygen and other gases excluding nitrogen, in place of air in pipe 29.

Generally very little air, or oxygen-containing gas, is added through line 33, the sole purpose of this line being to reduce carbon deposits on hydrocarbon injector 19 (if necessary) by discharging a small annular stream from surrounding pipe 41. This small supply of oxygen containing gas may be cut off by closing valve 36 without interrupting the process in many instances permanently or at least over long periods of time. By oxygen containing gas is meant a gas containing oxygen in a free or a combinable form under the conditions of the reaction in furnace 11.

The reactant material 12 is exposed to the heating effect of liquid fuel burner 28 in furnace 11 and is cracked to form carbon black which passes into the cooler 42 in the form of smoke. In order to stop the reaction with a maximum amount of unconsumed carbon black, it is desirable to quench this smoke below 1200 to 1600° F. in cooler 42, which may be done by one or more cooling methods, preferably by any one, two or all of three methods as will be explained. Preferably water from tank 43 is pumped by pump 44 through pipe 46 into pipes 47 and 48 controlled by valves 49 and 51. The smoke that passes through pipe 42 passes in indirect heat exchange with the water passing through water-cooling passage in cooler 42, which water emerges in a heated condition from pipe 52. The water that passes through pipe 47 is sprayed through a spray head 53 directly into the smoke inside the cooler in direct evaporative heat exchange. This water turns into vapor and may be removed as a gas along with the other gas in pipe 39.

There is also a certain amount of atmospheric cooling by indirect heat exchange with the air through the smoke pipe 54 and in any type of gas and solids separation system generally designated as 56, as is known to the prior art. The cooling system 42 may employ solely direct water quench 53, solely indirect water cooling 48, 52, or solely atmospheric cooling 54, or any combination thereof, although it is difficult to avoid having at least some atmospheric cooling at 54 or 56 in any system. In all events before gases in 39 or carbon black from 56 are exposed to the atmosphere they should be below the temperature at which they will rapidly combine with oxygen.

Figure 2:
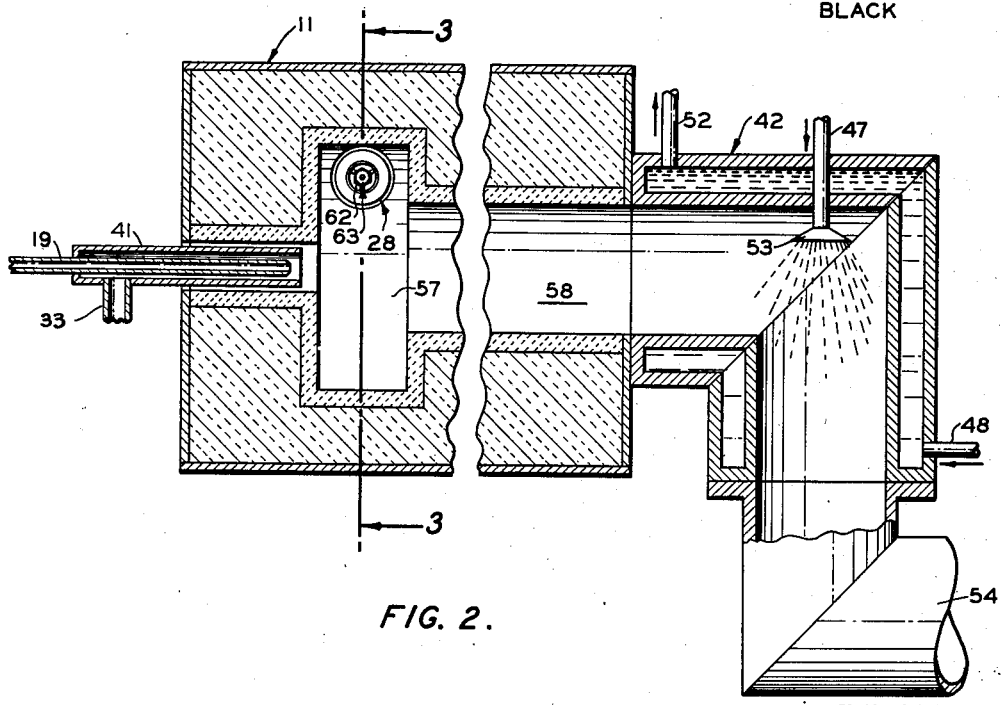
Figure 2 is a cross-sectional elevational view of the furnace shown in Figure 1, taken on the vertical plane that contains the longitudinal axis of the furnace.

The gas and solids separator may comprise the usual types of bag filters, electrical precipitators, cyclone separators or the like, or any combination of the same known to the prior art. The interior of furnace 11 is shown in Figure 2, and while it is preferred to use a furnace having an enlarged cylindrical portion 57 of greater diameter than length connected axially to a smaller diameter cylindrical portion 58 of greater length than diameter, valuable commercial results can be obtained in a furnace having a single cylindrical chamber 59 of uniform diameter as shown in Figure 8.

Figure 3:
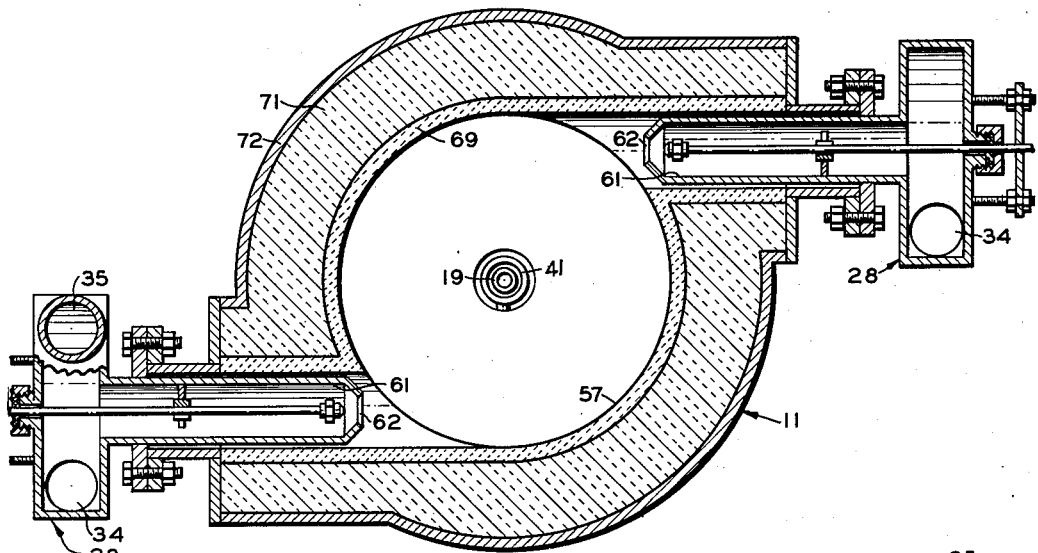
Figure 3 is a cross-sectional view of Figure 2 taken along line 3—3 looking in the direction indicated, except for a small portion in the lower left corner, which is partly in elevation.
Figure 5:
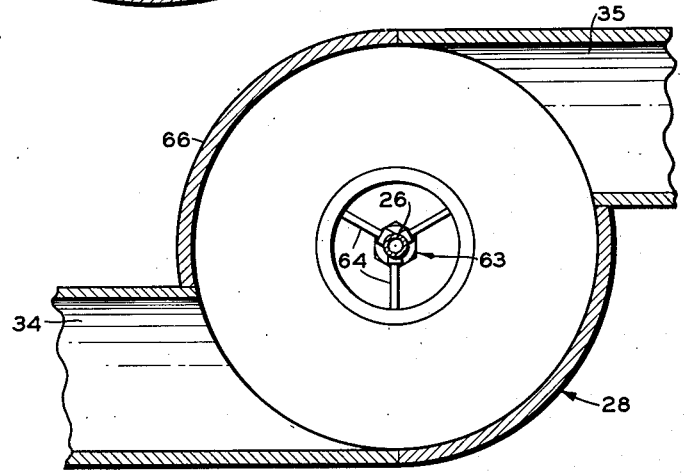
Figure 5 is a cross-section view of Figure 4 taken along the line 5—5 looking in the direction indicated.

In Figure 1 it will be noted that the carbon black furnace 11 comprises a round furnace chamber 57 (see Figure 2), a hydrocarbon injector 19 disposed to discharge a stream of hydrocarbons predominately axially into said chamber. An oil burner generally designated as 28 is disposed to discharge hot gases into said chamber 57. A cross section of Figure 2 is shown in Figure 3.

Said oil burner 28 comprises a round body 61 with an open outlet 62 communicating with said chamber 57 with the longitudinal axis of said body disposed predominantly tangent to the adjacent inner wall of said chamber 57. Said oil burner comprises an oil spray injector generally designated as 63 on oil supply pipe 26 is held in the center of body 61 by means of suitable braces 64 if necessary. Oil spray injector 63 is disposed to discharge an oil spray of liquid fuel 21 predominately axially into said body 61, and an air injector 34 is disposed communicating with said body 61 to discharge air into said body predominantly tangent to the adjacent inner wall of body 61. If desired a plurality of oil burners 28 may be employed and they may have a plurality of air supply pipes 34 and 35. Such duplications of parts are preferable because they have some advantages in stabilizing the conditions of operation of the furnace, but are not necessary to achieve some degree of commercial success.

Figure 4:
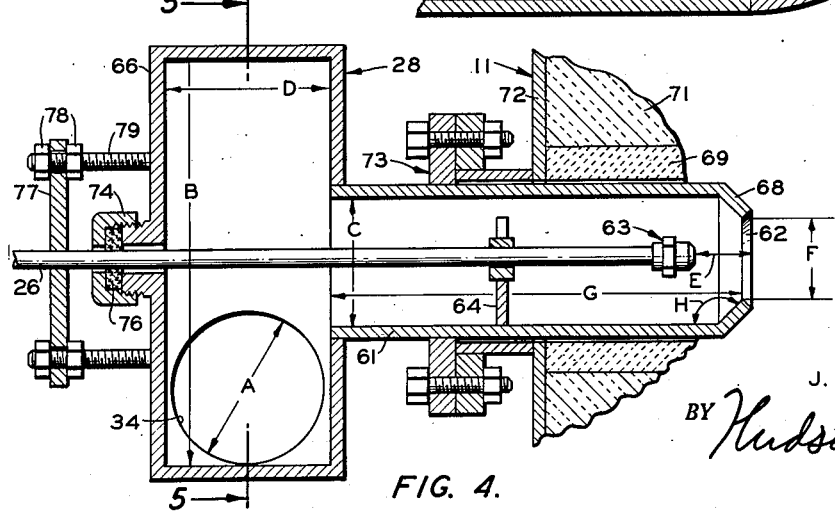
Figure 4 is an enlarged cross-sectional view of a portion of the structure shown in Figure 3 with the dimensions A, B, C, D, E, F, G and H indicated thereon.
Figure 8:
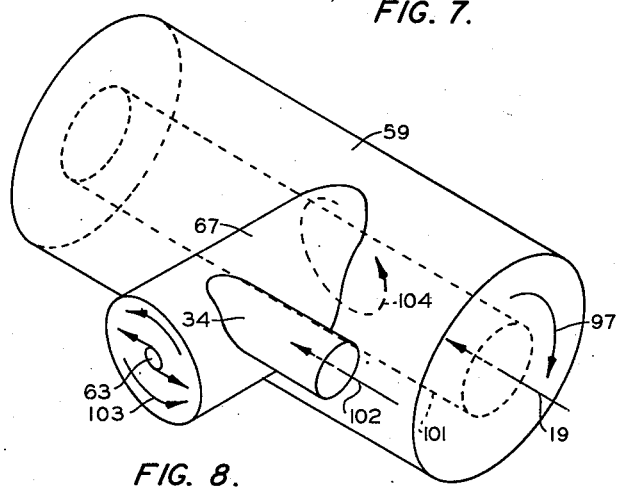
Figure 8 is a schematic diagram illustrating the theory of operation of one form of the invention.

As shown in Figure 4, body 61 preferably has an enlarged portion 66 for receiving the air pipes 34, although a single diameter for pipes 61 may be used as shown by corresponding pipe 67 in Figure 8.

Pipe 61 is preferably beveled inwardly at 68 around its outlet end 62, although valuable results may be obtained without such a bevel. Pipe 61 may be retained in the wall of furnace 11 by any suitable means, and the materials of construction of furnace 11 and burner 28 are not critical. As shown, furnace 11 is preferably lined with refractory material 69.

To save expense some of the material employed need not be refractory but need only be insulating, as at 71. It is usual to cover the exterior of such furnaces with a metal plate 72 which may be omitted however. When metal layer 72 is provided, it is conventional to secure burner 28 thereto by means of the flange connection generally designated as 73.

Figure 6:
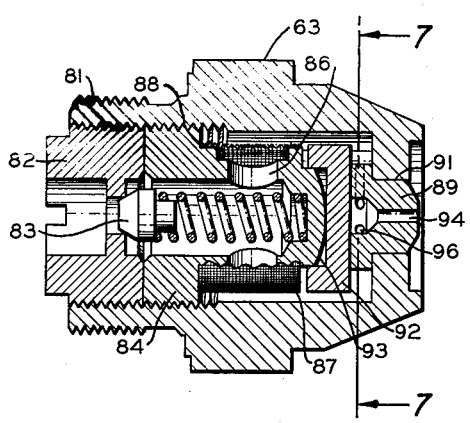
Figure 6 is a cross-sectional view of an oil burner nozzle, preferable in the embodiment shown in Figure 1, a portion of screen therein being shown in elevation, Figure 6 being taken along the line 6—6 in Figure 7 looking in the direction indicated.

Oil spray 63 is mounted on the end of oil supply pipe 26 and in order to adjust the position of the same a stuffing box 74 may be provided having a fiber washer 76 and pipe 26 may be held in adjusted position by flange 77 welded thereto and held in position by nuts 78 on stud 79 mounted on the exterior of chamber 66. While any type of spray head may be employed as head 63, in Figure 6 is shown the preferred form of head, which head is not invented by me although it forms one preferred element of the combination invented by me. Head 63 has external threads 81 for engaging with internal threads in the end of pipe 26, or other connection means may be used. Valve seat 82 is preferably removably secured in the head 63 and flow of fuel therethrough is controlled by spring closed check valve 83. The spring retainer 84 is also preferably removable for cleaning out the head 63 and contains openings 86 for the passage of fuel therethrough, which may be screened by surrounding cylindrical wire screen 87 in order to prevent the passage of foreign matter into the small diameter feed passage 96 where it might bridge across and close the same. Passage 86 leads to an annular groove 88 to increase the area of screen 87.

Bolt 84 is retaining flanged sleeve nipple 89 in place in opening 91 of body 63, while plate 92 and spherical surface 93 allow for minor movement and self-adjustment of sleeve 89 in head 63 to minimize leakage therebetween. Nipple 89 has a central passage 94 connecting with tangential passages 96, as clearly shown in Figure 7.

In Figure 4 there are given preferable dimensions for the burner 28. These dimensions are such that best results are obtained when:

$$A \geq C$$
$$D \geq A$$
$$B \geq 2A$$
$$C < G < 4C$$
$$0.3C < F < 0.7C$$
$$135° \leq H \leq 160°$$

In Figure 8 is shown the preferred form of the invention as to direction of rotation of various elements, although as to the shape of the furnace chambers the embodiment shown in Figures 1 to 7 is preferred.

In Figure 8 there is a single diameter furnace chamber 59 having a single diameter oil burner body 67, air comes in pipe 34 and oil is sprayed out of spray head 63, all in the direction indicated.

Figure 9:
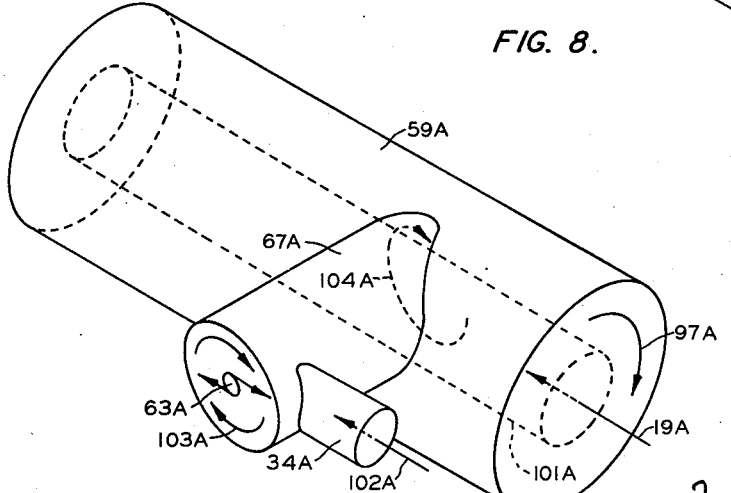
Figure 9 is a schematic diagram of a modified form of the invention.

In Figure 9 the direction of introduction of oil spray 63A and the oil burner 67A are in different directions in respect to furnace chamber 59A than in Figure 8 which results in a different degree of turbulence in the gases in the furnace.

EXAMPLE A

Figure 7:
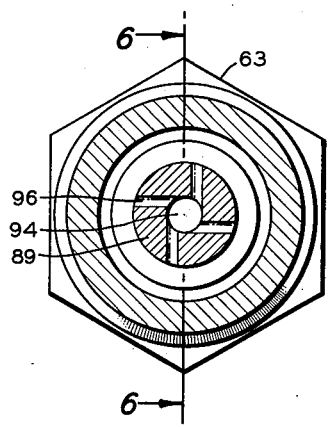
Figure 7 is a cross-sectional view of the structure shown in Figure 6 taken along the line 7—7 looking in the direction indicated.

Operating with a gas oil feed within the range set forth above, and operating a furnace of the type shown in Figures 1 and 7 with the direction of injection as shown in Figure 8, except that the oil spray 63 rotated clockwise, a very satisfactory carbon black was produced which imparted high resistance to abrasion in rubber samples made from a standard GR–S tread rubber. These carbon blacks listed in runs 1 to 4 were made respectively with oil rates of 200, 193, 180 and 168 gallons per hour in said reactor while employing fuel oil as shown in the burners 28 (see Table I below).

The basic rubber recipe employed in the evaluation was as follows:

| | |
|---|---|
| Standard GR–S tread rubber (X–452) | 100 |
| Black | 40 |
| Zinc oxide (#2) | 3.0 |
| BRT #7 (#1) | 6.0 |
| Sulfur (#1) | 1.75 |
| Santocure (#1) | 0.80 |

The stocks were cured at 307° F. for 10, 20, 30, 45 and 75 minutes intervals and the physical properties were determined on both original and aged vulcanizates.

Flange 73 in Figure 4 was positioned so that there was 13 inches of 8 inch diameter tunnel 69 between the end 62 of the burner tube 68 and the chamber 57 of Figure 3, and check valve 83 and spring (no numeral) of Figure 6 was omitted. While check valve 83 is of value it obviously is not at all essential.

The force of air 102 entering housing 67 through pipe 34 was so great as to overcome the clockwise force of the oil 63A, which preferably has less force than the air.

TABLE I

*Summary of physical properties (30 minute cure)*

| Run No. | Axial Oil Rate, G.P.H. | Tint | Photometer, Percent Transmission | Percent Grit, 325 Mesh | 80° F. | | | 200 F.,[a] Tensile, p.s.i. | Δ T, ° F. | Percent Permanent Set |
|---|---|---|---|---|---|---|---|---|---|---|
| | | | | | 300% Modulus, p.s.i. | Tensile, p.s.i. | Percent Elongation | | | |
| 1 | 200 | 164 | 98.0 | 0.010 | 1,290 | 3,300 | 530 | 1,190 | 67.9 | 3.5 |
| 2 | 193 | 154 | 98.2 | 0.150 | 1,320 | 3,270 | 510 | 1,120 | 67.6 | 3.0 |
| 3 | 180 | 162 | 98.6 | 0.020 | 1,240 | 3,330 | 535 | 1,260 | 66.6 | 3.5 |
| 4 | 168 | 163 | 99.5 | 0.120 | 1,240 | 3,130 | 520 | 1,370 | 67.6 | 4.1 |
| OVEN AGED 24 HOURS AT 212° F. | | | | | | | | | | |
| 1 | | | | | 2,200 | 3,190 | 400 | | 57.1 | 0.8 |
| 2 | | | | | 2,120 | 3,090 | 400 | | 58.1 | 0.8 |
| 3 | | | | | 2,120 | 3,150 E | 450 E | | 57.5 | 0.8 |
| 4 | | | | | 2,130 | 3,120 | 400 | | 57.5 | 0.8 |

| Run No. | Percent Resilience | Flex Life, M | Shore Hardness | Abrasion Loss [b] | Percent Compression Set | Cp'd MS 1½ | Extrusion at 250° F. | | |
|---|---|---|---|---|---|---|---|---|---|
| | | | | | | | In./Min. | Gms./Min. | Rating |
| 1 | 61.5 | 9.2 | 55 | 3.67 | 15.9 | 29 | 38.8 | 104.5 | 12– |
| 2 | 63.2 | 7.3 | 54.5 | 3.58 | 16.1 | 29.5 | 33.2 | 93 | 12– |
| 3 | 62.4 | 6.5 | 55 | 3.52 | 17.0 | 30 | 35.2 | 99 | 12– |
| 4 | 62.1 | 14.9 | 55 | 3.56 | 16.8 | 30 | 37.5 | 103 | 12– |
| OVEN AGED 24 HOURS AT 212° F. | | | | | | | | | |
| 1 | 70.5 | 4.4 | 61 | 4.15 | | | | | |
| 2 | 71.0 | 2.8 | 60 | 4.37 | | | | | |
| 3 | 70.3 | 4.6 | 60.5 | 4.26 | | | | | |
| 4 | 69.2 | 5.7 | 61 | 4.14 | | | | | |

[a] 45 minute cure.
[b] 35 minute cure.

TABLE II

*Stress-strain properties at 80° F.*

| Run No. | Minutes' Cure at 307° F. | P. s. i. at— | | | | | | Percent Elongation |
|---|---|---|---|---|---|---|---|---|
| | | 100% | 200% | 300% | 400% | 500% | Break | |
| 1 | 10 | 150 | 310 | 610 | 1,000 | 1,430 | 1,850 | 665 |
| | 20 | 220 | 580 | 1,170 | 1,880 | 2,660 | 3,090 | 550 |
| | 30 | 240 | 620 | 1,290 | 2,110 | 3,000 | 3,300 | 530 |
| | 45 | 250 | 680 | 1,410 | 2,270 | 3,160 | 3,430 | 530 |
| | 75 | 220 | 630 | 1,320 | 2,190 | 3,110 | 3,340 | 525 |
| 2 | 10 | 180 | 310 | 590 | 1,000 | 1,440 | 1,900 | 610 |
| | 20 | 200 | 510 | 1,080 | 1,790 | 2,570 | 2,990 | 555 |
| | 30 | 230 | 630 | 1,320 | 2,190 | 3,070 | 3,270 | 510 |
| | 45 | 250 | 650 | 1,320 | 2,120 | 3,090 | 3,210 | 505 |
| | 75 | 240 | 640 | 1,350 | 2,150 | 2,990 | 3,300 | 510 |
| 3 | 10 | 150 | 300 | 560 | 950 | 1,380 | 2,100 | 650 |
| | 20 | 220 | 540 | 1,160 | 1,800 | 2,580 | 3,210 | 590 |
| | 30 | 220 | 600 | 1,240 | 2,020 | 2,920 | 3,330 | 535 |
| | 45 | 260 | 670 | 1,410 | 2,210 | 3,180 | 3,470 | 525 |
| | 75 | 240 | 640 | 1,300 | 2,110 | 3,000 | 3,290 | 530 |
| 4 | 10 | 130 | 270 | 520 | 860 | 1,280 | 2,000 | 690 |
| | 20 | 200 | 490 | 1,020 | 1,700 | 2,430 | 3,100 | 600 |
| | 30 | 220 | 600 | 1,240 | 2,020 | 2,900 | 3,130 | 520 |
| | 45 | 230 | 600 | 1,220 | 2,020 | 3,000 | 3,400 | 565 |
| | 75 | 220 | 610 | 1,270 | 2,060 | 2,980 | 3,350 | 535 |

TABLE III

*Flex life, Shore hardness, abrasion loss*

[Flex life at 210° F., 3" stroke, 500 flexures per minute; Shore hardness—Type A durometer; abrasion loss—11° wheel angle, 33 lb. load, rotated on mounts every 375 revolutions for 3,000 revolutions.]

| Run No. | Minutes' Cure at 307° F. | Flex Life, M | Shore Hardness | Abrasion Loss,a Gms. | Oven-Aged 24 Hrs. @ 211° F. | | |
|---|---|---|---|---|---|---|---|
| | | | | | Flex Life, M | Shore Hardness | Abrasion Loss,a Gms. |
| 1 | 30 | 9.2L3 | 55 | 3.67 | 4.4R4 | 61 | 4.15 |
| | 45 | 9.3D2 | 55.5 | | 6.2D4 | 60 | |
| | 75 | 8.7L2 | 55.5 | | 4.7R2 | 59 | |
| 2 | 30 | 7.3LD3 | 54.5 | 3.58 | 2.8D4 | 60 | 4.37 |
| | 45 | 7.3L3 | 55 | | 5.6D4 | 59 | |
| | 75 | 9.8LD3 | 55 | | 5.4LD3 | 58 | |
| 3 | 30 | 6.5L1 | 55 | 3.52 | 4.6L4 | 60.5 | 4.26 |
| | 45 | 7.2L3 | 55.5 | | 4.7L4 | 60 | |
| | 75 | 8.9LD3 | 56 | | 6.5LD3 | 59.5 | |
| 4 | 30 | 14.9RL3 | 55 | 3.56 | 5.7LD3 | 61 | 4.14 |
| | 45 | 8.6L4 | 55.5 | | 4.2LD4 | 60 | |
| | 75 | 8.6L2 | 56 | | 7.4LD4 | 59 | | a 35' cure time.

OPERATION

In Figure 8 it will be noted that the reactant material 19 moves as shown by the arrow 19 in the form of a cylinder 101 at least in the first portion of furnace 59. Air 34 enters in the direction of arrow 102 into body 61 where it rotates in the direction shown by arrow 103. The oil spray coming out of head 63 emerges in the direction of the two arrows shown tangent thereto and reinforces the rotary movement in the direction 103 because oil spray injector 63 is discharging the oil with a substantial rotational component of motion in the same direction as the rotation of the air 103. Note that the direction of rotation shown by arrow 104 at the point adjacent the stream 101 is such that the oil burner discharges hot gases with the substantial rotational component of motion in such direction that the portion of said rotating hot gases that contacts said predominantly axial stream of hydrocarbon is moving predominately in the opposite direction to said axial stream, which causes an increase in the turbulence in the furnace and improved mixing which results in a carbon black more reinforcing to rubber with which it is compounded. Cylinder 101 is broken up and mingles with the helical layer 97 very soon and the whole mass rotates together with considerable turbulence.

When so operating, the heat pyrolyzes or cracks the vaporous or in some instances finely sprayed liquid hydrocarbon 101 and forms a smoke containing carbon black which is cooled in cooler 42 and the carbon black separated therefrom in separator 56, all as explained in detail above. While it is preferred to operate with the direction of injection of air as shown in Figure 8, it is desirable sometimes to decrease the amount of turbulence in the furnace. The turbulence can be partly decreased by operating as shown in Figure 9 with the direction of the rotation of the hot gases 103A such that the portion contacting the axially moving gases 19A at 97A will be in the same direction as the axially moving gases. This will partly decrease the degree of turbulence.

On the other hand turbulence can be decreased to some degree by reversing the direction of introduction of oil spray from head 63A to the direction of air introduction 103A in Figure 9. It is not believed necessary to have four figures of drawing as it should be obvious that both directions of rotation shown by 63 or 63A can be used in either Figure 8 or 9.

Increased turbulence results in more rapid burning of the hydrocarbon with the result that less carbon black is made but the carbon black has better reinforcing properties in rubber, more resistance to abrasion. It is desired to claim both the preferred directions of rotation and those which give different results, it being believed that generic claims are allowable.

While a number of specific embodiments of the invention have been shown and described for the purpose of illustrating the same, obviously the invention is not limited thereto, and is as set forth in the following claims.

Having described my invention, I claim:

1. A carbon black furnace comprising in combination a first cylindrical chamber of greater diameter than length and a second cylindrical coaxial chamber of lesser diameter communicating therewith, said second chamber being of greater length than diameter, a hydrocarbon injector disposed to discharge a stream of hydrocarbons predominately axially into said first chamber, and an oil burner disposed to discharge hot gases into said first chamber, said oil burner comprising a body comprising a first cylindrical pipe of greater diameter than length and a second cylindrical pipe of lesser diameter communicating therewith, said second pipe being of greater length than diameter and having an open outlet end communicating with said first chamber with the longitudinal axis of said second pipe disposed predominately tangent to the adjacent inner wall of said first chamber, an oil spray injector disposed to discharge oil spray predominately axially into said second pipe, and an air injector comprising a third pipe having an outlet communicating with said first pipe and disposed to discharge air into said first pipe predominately tangent to the adjacent inner wall of said first pipe.

2. A carbon black furnace comprising in combination a first cylindrical chamber of greater diameter than length and a second cylindrical coaxial chamber of lesser diameter communicating therewith, said second chamber being of greater length than diameter, a hydrocarbon injector disposed to discharge a stream of hydrocarbons predominately axially into said first chamber, and a fuel burner disposed to discharge hot gases into said first chamber, said fuel burner comprising a body comprising a first cylindrical pipe of greater diameter than length and a second cylindrical pipe of lesser diameter communicating therewith, said second pipe being of greater length than diameter and having an open outlet end communicating with said first chamber with the longitudinal axis of said second pipe disposed predominately tangent to the adjacent inner wall of said first chamber, a fuel injector disposed to discharge fuel into said second pipe and an air injector comprising a third pipe having an outlet communicating with said first pipe and disposed to discharge air into said first pipe predominately tangent to the adjacent inner wall of said first pipe.

3. The process of making carbon black comprising the steps of passing a vaporous column of hydrocarbon axially through a heating zone, producing, heating and imparting a rotary motion to gases to produce a rotating column of hot gases with a higher pressure than exists in said zone, and introducing said rotating column of hot gases into said zone substantially tangent to the exterior surface of said axial column with the direction of said rotation of said hot gases in such direction that that portion of said rotating hot gases that contacts said axial column is moving predominately in the same direction as said axial stream.

4. The process of making carbon black comprising the steps of passing said vaporous column of hydrocarbon axially through a heating zone, producing, heating and imparting a rotary motion to gases to produce a rotating column of hot gases with a higher pressure than exists in said zone, and introducing a rotating column of hot gases into said zone substantially tangent to the exterior surface of said axial column with the direction of said rotation of said hot gases in such direction that that portion of said rotating hot gases that contacts said axial column is moving predominately in the opposite direction to said axial stream.

JOSEPH C. KREJCI.

References Cited in the file of this patent

UNITED STATES PATENTS

| Number | Name | Date |
|---|---|---|
| 1,656,711 | Scott | Jan. 17, 1928 |
| 2,214,246 | Finnigan | Sept. 10, 1940 |
| 2,215,941 | Smoot | Sept. 24, 1940 |
| 2,419,565 | Krejci | Apr. 29, 1947 |